(12) United States Patent
Zhou

(10) Patent No.: US 9,519,172 B2
(45) Date of Patent: Dec. 13, 2016

(54) BACKPLATE ASSEMBLY, BACKLIGHT MODULE AND DISPLAY DEVICE

(71) Applicants: BOE Technology Group Co., Ltd., Beijing (CN); Beijing BOE Chatani Electronics Co., Ltd., Beijing (CN)

(72) Inventor: Peng Zhou, Beijing (CN)

(73) Assignees: BOE Technology Group Co., Ltd., Beijing (CN); Beijing BOE Chatani Electronics Co., Ltd., Beijing (CN)

(*) Notice: Subject to any disclaimer, the term of this patent is extended or adjusted under 35 U.S.C. 154(b) by 72 days.

(21) Appl. No.: 14/518,526

(22) Filed: Oct. 20, 2014

(65) Prior Publication Data

US 2015/0370132 A1    Dec. 24, 2015

(30) Foreign Application Priority Data

Jun. 23, 2014  (CN) .......................... 2014 2 0336566

(51) Int. Cl.
*G02F 1/1333*    (2006.01)
*G02F 1/1335*    (2006.01)

(52) U.S. Cl.
CPC ... *G02F 1/133308* (2013.01); *G02F 1/133605* (2013.01); *G02F 1/133608* (2013.01); *G02F 2001/133314* (2013.01); *G02F 2001/133328* (2013.01); *Y10T 428/24322* (2015.01); *Y10T 428/24777* (2015.01)

(58) Field of Classification Search
CPC .............. G02F 2001/133314; G02F 1/133308; G02F 1/133608; G02F 1/133605
See application file for complete search history.

(56) References Cited

U.S. PATENT DOCUMENTS

| | | | | |
|---|---|---|---|---|
| 7,604,373 B2* | 10/2009 | Chang | ............... | G02F 1/133608 349/58 |
| 8,792,066 B2* | 7/2014 | Zhang | ....................... | H05K 5/02 349/58 |
| 8,950,927 B2* | 2/2015 | Li | ..................... | G02F 1/133308 362/632 |
| 9,046,635 B2* | 6/2015 | Bae | ....................... | G02B 6/0088 |
| 2007/0091230 A1* | 4/2007 | Ouderkirk | ............ | G02B 6/0055 349/96 |
| 2010/0277664 A1* | 11/2010 | Kim | ..................... | G02B 6/0085 349/58 |
| 2012/0218752 A1* | 8/2012 | Sumitani | ................... | F21K 9/54 362/235 |
| 2014/0240606 A1* | 8/2014 | Tomomasa | ........ | G02F 1/133308 348/725 |

* cited by examiner

*Primary Examiner* — Kendrick Hsu
(74) *Attorney, Agent, or Firm* — Westman, Champlin & Koehler, P.A.

(57) ABSTRACT

A backplate assembly is provided. The backplate assembly comprises a backplate and a reinforcing assembly, the reinforcing assembly comprises a peripheral reinforcing member connected to a peripheral portion of the backplate, and a wiring channel is provided at inner side of the peripheral reinforcing member. Preferably, the reinforcing assembly further comprises at least one intermediate reinforcing member connected to the back side of the backplate. The present invention further discloses a backlight module comprising the backplate assembly, and a display device comprising the backlight module.

20 Claims, 4 Drawing Sheets

BACKPLATE ASSEMBLY, BACKLIGHT MODULE AND DISPLAY DEVICE

CROSS-REFERENCE TO RELATED APPLICATION

This application claims the benefit of Chinese Patent Application No. 201420336566.7 filed on Jun. 23, 2014 in the State Intellectual Property Office of China, the whole disclosure of which is incorporated herein by reference.

BACKGROUND OF THE INVENTION

1. Field of the Invention

Embodiments of the present invention relate to display technology, and in particular, to a backplate assembly and a backlight module having the same, and a display device.

2. Description of the Related Art

With development of the liquid crystal industry and strong market demand, super-large liquid crystal modules are widely used. In order to achieve a high brightness characteristic in the super-large liquid crystal module, a direct-below design is typically used in a liquid crystal panel in which a LED light source is placed directly below an optical sheet to emit light.

Currently, as shown in FIG. 1, peripheral portions of a backplate tend to be deformed after bending due to large size of the backplate, and therefore the backplate needs to be provided with reinforcing structures, for example, convex portions 101 shown in FIG. 1. The convex portions 101 act to increase strength of the backplate. A recess at periphery of the convex portions 101 is a wiring channel 102 for routing light source wires, which will be fixed by adhesive tapes after being routed. In such a design, however, the number of the convex portions is large and the sizes of the convex portions are too large, thus, the backplate tend to be warped after laminating and assembling the backplate, making it hard to ensure flatness of the backplate and in turn the flatness of the liquid crystal panel. In addition, conducting wires for the light source need to be arranged within the convex portions of the backplate and have a long length, making it difficult to route the wires. Lastly, it is costly to stamp out such convex portions on the backplate, and sufficient spaces for wiring needs to be retained at periphery of the convex portions during stamping.

SUMMARY OF THE INVENTION

An object of the present application is to provide a backplate assembly, which can overcome technical problems in prior arts, such as non-flatness and difficulties in wiring and assembling of the backplate due to the convex portions on the backplate and the wiring of the conducting wires for the light source within the wiring channel adjacent to the convex portions.

In order to solve at least one aspect of the above problems, in one aspect of the present invention, there is provided a backplate assembly. The backplate assembly comprises a backplate and a reinforcing assembly. Wherein, the reinforcing assembly comprises a peripheral reinforcing member connected to a peripheral portion of the backplate, and a wiring channel is provided at inner side of the peripheral reinforcing member. According to one embodiment of the present invention, the reinforcing assembly further comprises at least one intermediate reinforcing member connected to the back side of the backplate.

In another aspect of the present invention, there is further provided a backlight module comprising a light source, a bottom reflective sheet, an optical film, and the backplate assembly as described above. The light source, the bottom reflective sheet and the optical film are assembled together by the backplate assembly.

In a further aspect of the present invention, there is also provided a display device comprising the backlight module.

DETAILED DESCRIPTION OF PREFERRED EMBODIMENTS OF THE INVENTION

Figure 1:
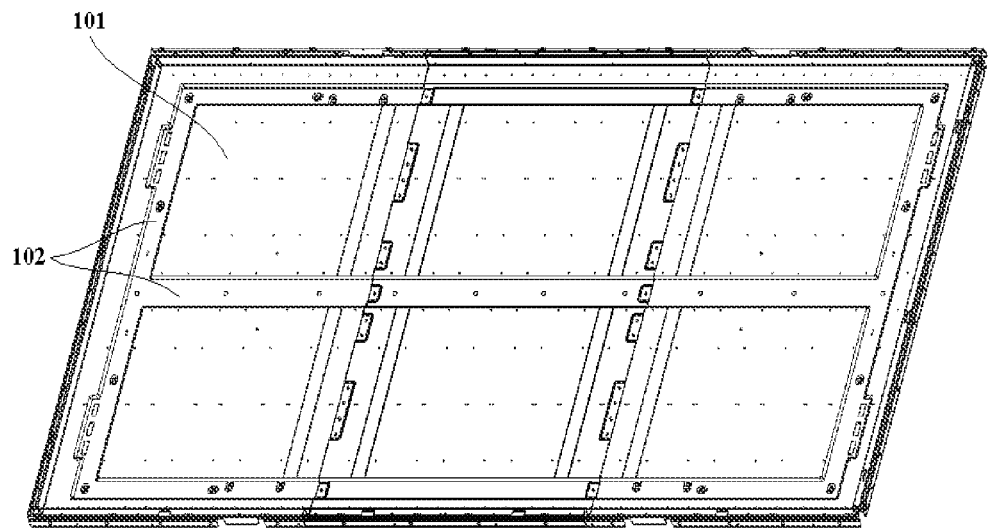
FIG. 1 is a front view showing a backplate provided with convex portions in prior arts.
Figure 2:
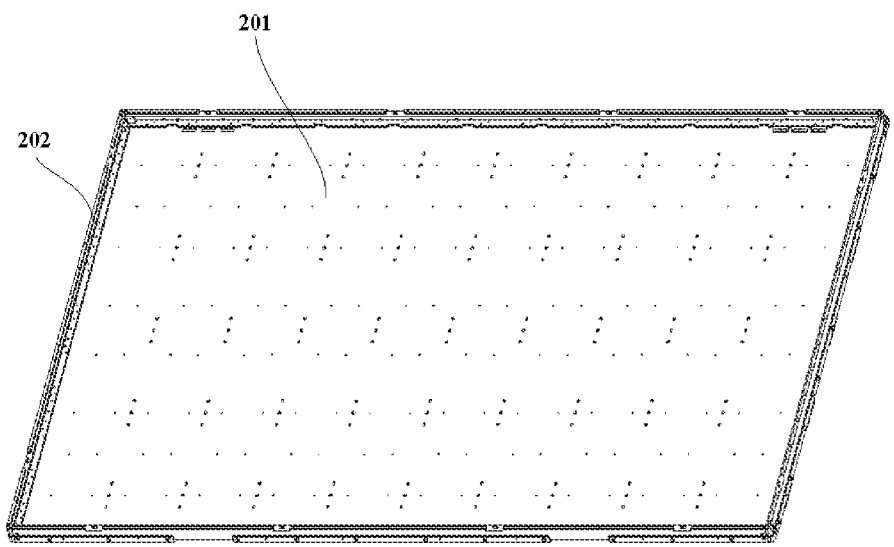
FIG. 2 is a front view showing a backplate assembly according to one embodiment of the present invention.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

It is noted that in the description of the present application, orientations or position relationships indicated by terms such as "upper", "lower", "front", "rear", "inside", "outside" and the like are those shown with respect to the drawings, these terms are merely used to facilitate understanding of the present application and to simplify the description, and the use of such terms does not indicate or imply that devices or elements indicated by these terms have to be positioned in particular orientations, and to be configured and operated in particular orientations, and thus are not limitative to the present application. Unless specifically stated to the contrary, terms "mount", "connect with", "connect to" should be interpreted in a broad sense, for example, the connection between two components may be a fixed connection, a removable connection or an integral connection; or it may be a mechanical connection or an electrical connection; or it may be a direct connection or an indirect connection via an intermediate component, or it may also be some kind of communication between interiors of two elements. Specific meanings of the above terms may be understood by those skilled in the art based on specific situations. In addition, in the description of the present application, the terms "a plurality of" means two or more, unless otherwise stated.

As shown in FIGS. 2-7, a backplate assembly according to one embodiment of the present application comprises a backplate 201 and a reinforcing assembly, the reinforcing assembly comprises a peripheral reinforcing member 202 fixed, for example, through a rivet or the like, onto a peripheral portion of the backplate 201, and an intermediate reinforcing member 203 connected, for example, through a rivet or the like, to a back side of the backplate 201. In one alternative embodiment not shown, the reinforcing assembly does not comprise the intermediate reinforcing member 203, or only comprises the peripheral reinforcing member 202.

Figure 3:
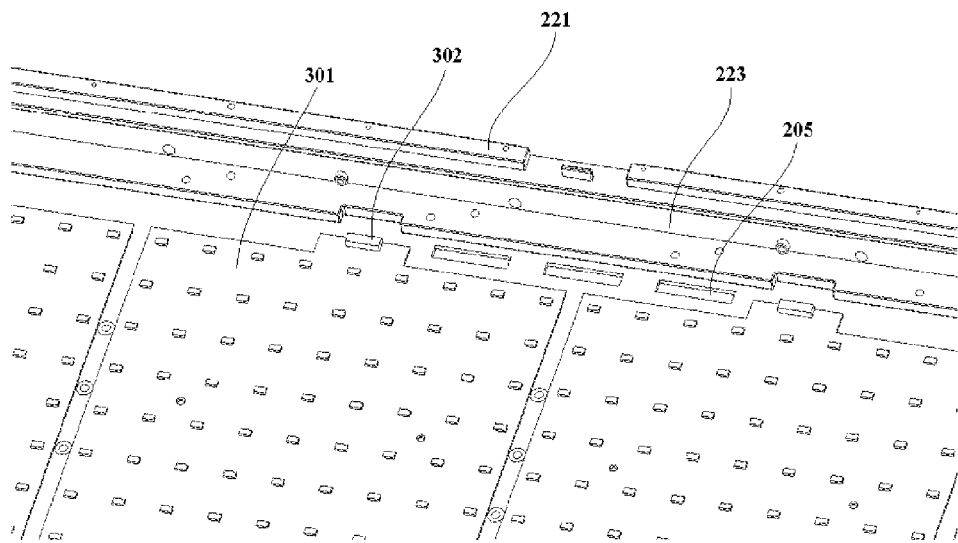
FIG. 3 is a partially enlarged front view of the backplate assembly shown in FIG. 2.
Figure 4:
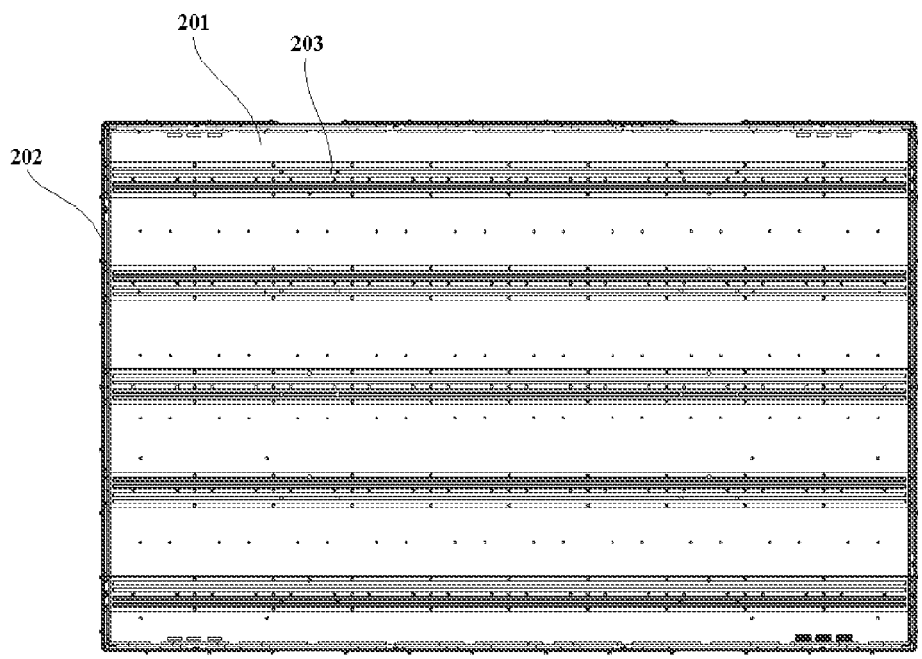
FIG. 4 is a rear view of the backplate assembly shown in FIG. 2.
Figure 5:
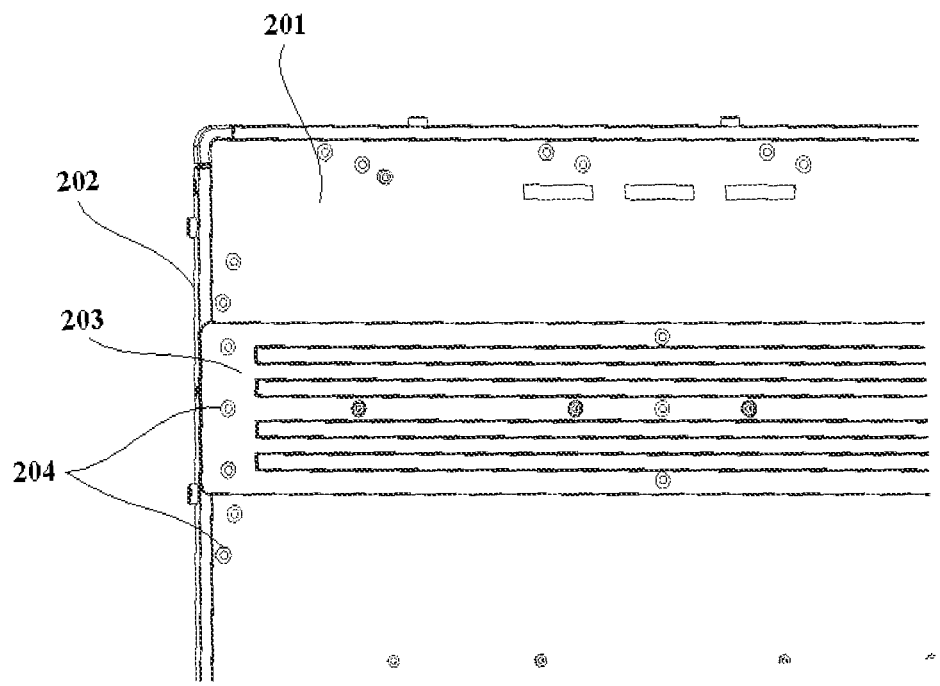
FIG. 5 is a partially enlarged rear view of the backplate assembly shown in FIG. 2.

The backplate 201 is in a form of a rectangular flat plate, and in the present embodiment, the backplate 201 has a size preferably corresponding to the size of a super-large liquid crystal module in which the backplate is used. A plurality of openings for wiring 205 are provided near or at a peripheral portion of the backplate 201 for wiring (as shown in FIG. 3, three openings 205 are included in one group).

Figure 6:
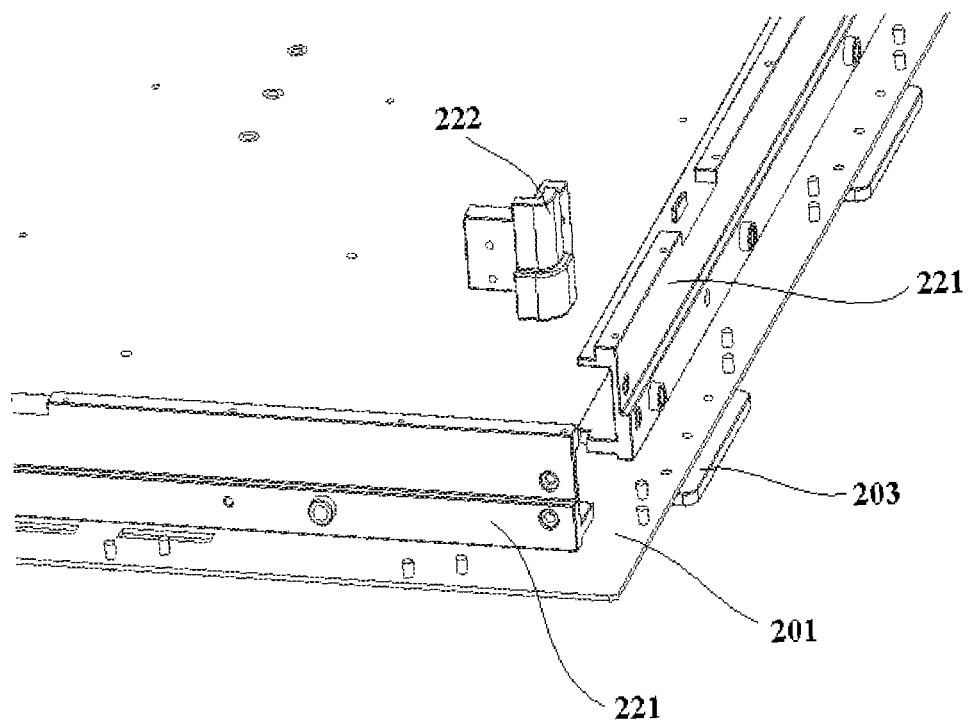
FIG. 6 is a perspective exploded view of the backplate assembly shown in FIG. 2.
Figure 7:
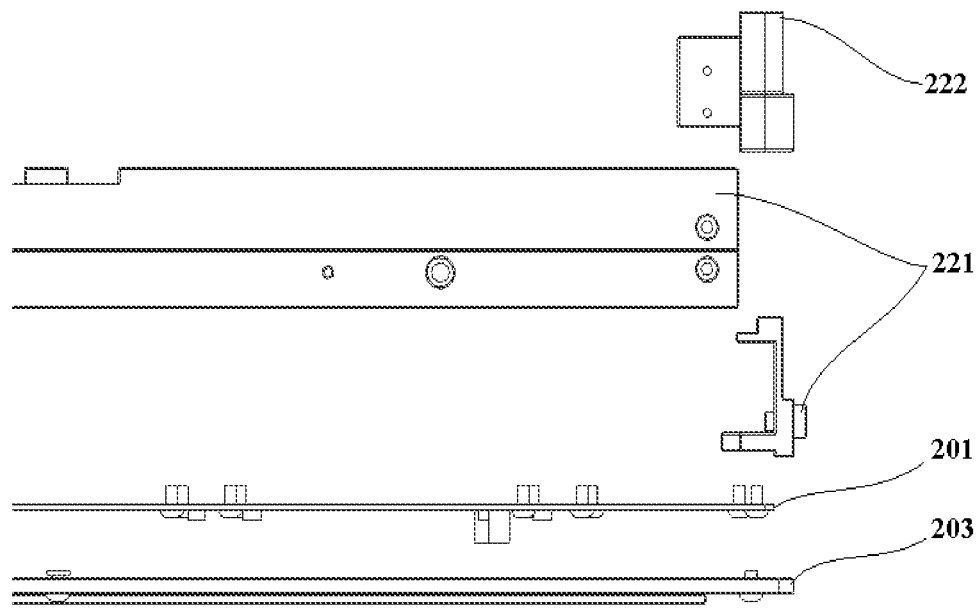
FIG. 7 is an exploded side view of the backplate assembly shown in FIG. 2.

The peripheral reinforcing member 202 protrudes upward from the front face of the backplate 201, and is provided with a recessed wiring channel 223 on one side thereof facing a center of the backplate 201. Thus, the cross section the peripheral reinforcing member 202 is in a shape of a thwart letter "U", as shown in FIG. 6. The wiring channel 223 is used for providing space for routing conducting wires for a light source, so that in a backlight module, the conducting wires for the light source can be arranged within the peripheral reinforcing member 202. Thus, as compared to the punched convex portions for increasing strength and providing wiring channels on the backplate, with the peripheral reinforcing member 202 having the above configuration, wiring can be facilitated, the length of the conducting wires can be reduced since wiring on the backplate is not needed, thereby eliminating the difficulties in wiring and assembling of the backlight module.

According to one embodiment of the present invention, the peripheral reinforcing member 202 may comprise a plurality of side reinforcing members connected together, for example, through rivets. In this embodiment, the peripheral reinforcing member 202 comprises four side reinforcing members 221 corresponding to four sides of the rectangular backplate 201 respectively. The peripheral reinforcing member 202 further comprises four connection joints 222 for connecting adjacent side reinforcing members 221 together, for example, by rivets, and the four side reinforcing members 221 and the four connection joints 222 are, for example, riveted together to form the peripheral reinforcing member 202 in the form of a rectangular frame. Such a peripheral reinforcing member 202 is formed by joining a plurality of segments together and is riveted onto the peripheral portion of the backplate 201. Each side reinforcing member is manufactured separately and is riveted together with other side reinforcing members, instead of integrally forming the entire peripheral reinforcing member, thus, the technical problem of wiring is solved, and at the same time, the operation of integrally forming the super-large backplate is simplified, and the technical problems, such as warping caused by bending the peripheral portion of the backplate during integrally forming the super-large backplate, are solved, thereby a better flatness of the backplate 201 is ensured.

In an alternative embodiment of the present invention, the reinforcing assembly comprises at least one intermediate reinforcing member 203. As shown in an exemplary embodiment of the present invention, there are a plurality of intermediate reinforcing members 203, and the plurality of intermediate reinforcing members 203 are arranged in parallel with and equidistantly spaced apart from each other on the back side of the backplate 201 (shown in FIG. 4). Specifically, each intermediate reinforcing member 203 may be provided with several strip-like reinforcing ribs, and intermediate reinforcing members 203 act to improve the strengthening of the backplate. In an embodiment not shown, the intermediate reinforcing member(s) may also be configured as one integrated intermediate reinforcing member having a crossed shape (for example, an "X" shape, or a crisscross). In another embodiment not shown, the intermediate reinforcing member(s) may also have other shapes, as long as the shape can facilitate manufacturing of the backplate and/or effectively increase the strength of the backplate. A combination of the intermediate reinforcing member 203 and the peripheral reinforcing member 202 may provide a better flatness of the backplate 201. Because the backplate itself is not provided with any reinforcing rib or reinforcing structure for increasing strength and the strength of the backplate is mainly provided by the intermediate reinforcing member 203 on its back face, bending of the backplate 201 in its entirety and wrapping of the backplate 201 will not be generated when the four side reinforcing members 221 and the connection joints 222 are fixed, for example, by a rivet 204, onto the flat backplate 201.

The riveted connection of the present embodiment may be replaced by a screw connection or other similar connection, as long as the connection can be used to connect various components of the backplate assembly together as required.

Figure 8:
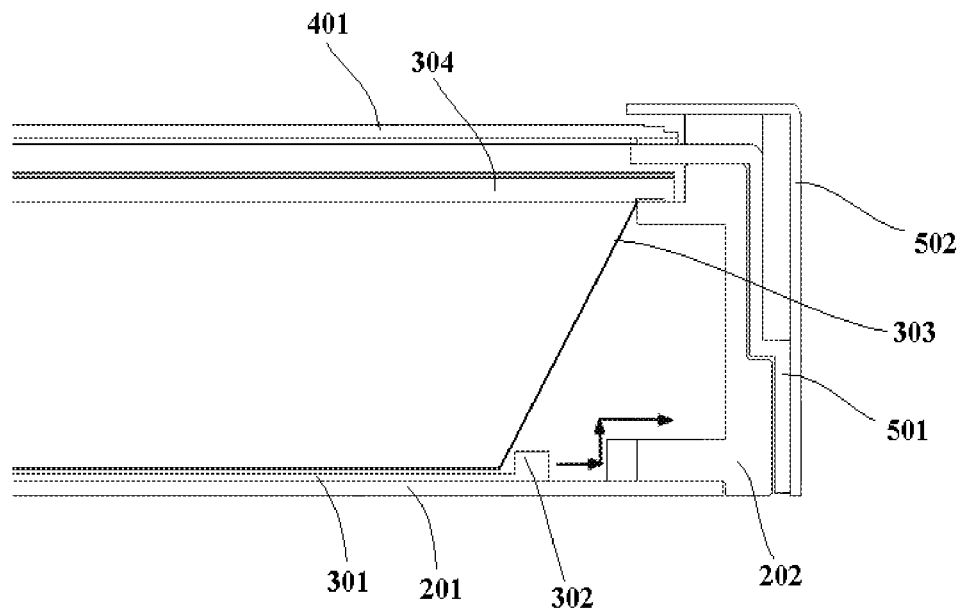
FIG. 8 is a partially cutaway view of a display device according to one embodiment of the present invention, showing a backlight module comprising a backplate assembly.

FIG. 8 shows a display device according to one embodiment of the present invention. The display device comprises a backlight module according to one embodiment of the present invention, and the backlight module comprises a backplate assembly as described above. In addition, the backlight module further comprises a light source 301, a bottom reflective sheet 303, and an optical film 304. The light source 301 comprises an LED light source arranged on the backplate 201 of the backplate assembly, the light source 301 comprises a plurality of light source terminals 302 located near the peripheral portion of the backplate 201 (as shown in FIG. 3, at both sides of the openings for wiring 205), the bottom reflective sheet 303 is disposed on an upper side of the light source 301 and has a peripheral portion lapped on an upper portion of the side reinforcing member 221, and the optical film 304 is disposed on an upper side of the bottom reflective sheet 303 and has a peripheral portion lapped on an upper end of the side reinforcing member 221.

As shown in FIG. 8, the display device according to the embodiment of the present invention comprises a liquid crystal module which comprises a liquid crystal screen 401 and the backlight module as described above.

According to the embodiment shown in FIG. 8, preferably, a rubber frame 501 and a metal frame 502 are further provided outside the peripheral reinforcing member 202 of the backplate assembly. The liquid crystal screen 401 is disposed on an upper side of the optical film 304 and has a peripheral portion lapped on an upper end of the rubber frame 501. When the light source 301 emits light, the whole liquid crystal screen 401 is lighted by the light passing through the bottom reflective sheet 303. The peripheral reinforcing member 202 of the backplate assembly will not significantly increase entire thickness of the outer frames of the backlight module, which will meet the requirement of a Narrow Bezel design. Further, in a direct-below type backlight module, light mixing height is larger, that is, the distance from the bottom face of the backplate 201 to the rubber frame 501 is relative larger, while the backlight module in prior arts does not have such a configuration as the present invention does.

Connection and wiring from the light source terminals 302 of the light source 301 are indicated by an arrow direction shown in FIG. 8, and conducting wires are arranged to extend from the light source terminals 302 into the wiring channel 223 of the peripheral reinforcing member 202 of the backplate assembly.

The peripheral reinforcing member of the backplate assembly of the present invention is connected onto the peripheral portion of the backplate, thereby not only difficulty in integrally forming the super-large backplate is removed, but also the warping phenomenon of the backplate caused by bending of the peripheral portion of the backplate during the integrally forming of the backplate is eliminated, and thereby the flatness of the backplate is ensured. With the wiring channels being provided at inner side of the peripheral reinforcing member, and conducting wires for light source being routed within the wiring channel of the peripheral reinforcing member, the length of the conducting wires is effectively reduced, difficulties in wiring and assembling can be eliminated, and production efficiency can be greatly improved.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

REFERENCE NUMBERS

101: convex portion;
102: wiring channel;
201: backplate;
202: peripheral reinforcing member;
221: side reinforcing member;
222: connection joint;
223: wiring channel;
203: intermediate reinforcing member;
204: rivet;
205: opening for wiring;
301: light source;
302: light source terminal;
303: bottom reflective sheet;
304: optical film;
401: liquid crystal screen:
501: rubber frame;
502: metal frame.

What is claimed is:

1. A backlight module comprising:
   a light source;
   a bottom reflective sheet;
   an optical film; and
   a backplate assembly,
   wherein the light source, the bottom reflective sheet and the optical film are assembled together through the backplate assembly;
   wherein the backplate assembly comprises a backplate and a reinforcing assembly, the reinforcing assembly comprises a peripheral reinforcing member connected to a peripheral portion of the backplate, and the peripheral reinforcing member is provided with a wiring channel in an inner surface of the peripheral reinforcing member;
   wherein the light source is disposed on the backplate of the backplate assembly, the bottom reflective sheet is disposed at a side of the light source opposite to the backplate, the optical film is disposed on an upper side of the bottom reflective sheet opposite to the light source, and a liquid crystal screen is disposed at a side of the optical film opposite to the bottom reflective sheet;
   wherein the bottom reflective sheet comprises a bottom portion and a plurality of inclined sidewalls extending from the bottom portion in a direction away from the backplate; and
   wherein a space communicated with the wiring channel is formed by the sidewalls of the bottom reflective sheet, the peripheral reinforcing member and the backplate, and a terminal of the light source is located within the space.

2. The backlight module according to claim 1, wherein the reinforcing assembly further comprises at least one intermediate reinforcing member connected to the back side of the backplate.

3. The backlight module according to claim 2, wherein the at least one intermediate reinforcing member comprises a plurality of intermediate reinforcing members arranged in parallel with and equidistantly spaced apart from each other.

4. The backlight module according to claim 3, wherein the backplate is connected with the intermediate reinforcing member through riveted connection.

5. The backlight module according to claim 1, wherein the backplate comprises a plurality of openings for wiring at or near its peripheral portion.

6. The backlight module according to claim 5, wherein a plurality of openings for wiring are arranged near the peripheral reinforcing member.

7. A display device comprising the backlight module according to claim 1.

8. The display device according to claim 7, wherein the reinforcing assembly further comprises at least one intermediate reinforcing member connected to the back side of the backplate.

9. The display device according to claim 8, wherein the at least one intermediate reinforcing member comprises a plurality of intermediate reinforcing members arranged in parallel with and equidistantly spaced apart from each other.

10. The display device according to claim 9, wherein the backplate is connected with the intermediate reinforcing member through riveted connection.

11. The display device according to claim 7, wherein the backplate comprises a plurality of openings for wiring at or near its peripheral portion.

12. The display device according to claim 11, wherein a plurality of openings for wiring are arranged near the peripheral reinforcing member.

13. The display device according to claim 7, wherein the peripheral reinforcing member comprises a plurality of side reinforcing members connected together, each side reinforcing member corresponds to one side of the backplate respectively.

14. The display device according to claim 13, wherein the backplate is a rectangular-shaped backplate and the peripheral reinforcing member comprises four side reinforcing members corresponding to four sides of the rectangular-shaped backplate respectively.

15. The display device according to claim 14, wherein the peripheral reinforcing member further comprises four connection joints for connecting adjacent side reinforcing members together.

16. The display device according to claim 7, wherein the backplate is connected with the peripheral reinforcing member through riveted connection.

17. The backlight module according to claim 1, wherein the peripheral reinforcing member comprises a plurality of side reinforcing members connected together, each side reinforcing member corresponds to one side of the backplate respectively; wherein each sidewall of the bottom reflective sheet is lapped with a respective side reinforcing member at an end thereof away from the backplate, and an edge of the optical film is also lapped with the respective side reinforcing member at the end away from the backplate.

18. The backlight module according to claim 17, wherein the backplate is a rectangular-shaped backplate and the peripheral reinforcing member comprises four side reinforcing members corresponding to four sides of the rectangular-shaped backplate respectively.

19. The backlight module according to claim 18, wherein the peripheral reinforcing member further comprises four connection joints for connecting adjacent side reinforcing members together.

20. The backlight module according to claim 1, wherein the backplate is connected with the peripheral reinforcing member through riveted connection.

* * * * *